United States Patent
Barnich et al.

(10) Patent No.: US 12,495,124 B2
(45) Date of Patent: Dec. 9, 2025

(54) METHOD AND SYSTEM FOR VIDEO FRAME INTERPOLATION

(71) Applicant: EVS Broadcast Equipment SA, Seraing (BE)

(72) Inventors: Oliver Barnich, Liège (BE); Martin Castin, Liège (BE); Quentin Massoz, Flèmalle (BE)

( * ) Notice: Subject to any disclaimer, the term of this patent is extended or adjusted under 35 U.S.C. 154(b) by 19 days.

(21) Appl. No.: 18/434,233

(22) Filed: Feb. 6, 2024

(65) Prior Publication Data
US 2025/0254266 A1    Aug. 7, 2025

(51) Int. Cl.
*H04N 7/01*    (2006.01)
*G06T 3/4053*  (2024.01)
*G06V 10/771*  (2022.01)

(52) U.S. Cl.
CPC ......... *H04N 7/0135* (2013.01); *G06T 3/4053* (2013.01); *G06V 10/771* (2022.01); *H04N 7/013* (2013.01)

(58) Field of Classification Search
CPC ............ G06T 5/50; G06T 2207/20084; G06T 3/4046; G06T 5/60; G06T 7/55; G06T 9/002
See application file for complete search history.

(56) References Cited

PUBLICATIONS

Choi M, Kim H, Han B, Xu N, Lee KM. Channel attention is all you need for video frame interpolation. InProceedings of the AAAI conference on artificial intelligence Apr. 3, 2020 (vol. 34, No. 07, pp. 10663-10671). (Year: 2020).*

Zhou C, Lu Z, Li L, Yan Q, Xue JH. How video super-resolution and frame interpolation mutually benefit. InProceedings of the 29th ACM International Conference on Multimedia Oct. 17, 2021 (pp. 5445-5453). (Year: 2021).*

Priessner M, Gaboriau DC, Sheridan A, Lenn T, Garzon-Coral C, Dunn AR, Chubb JR, Tousley AM, Majzner RG, Manor U, Vilar R. Content-aware frame interpolation (CAFI): deep learning-based temporal super-resolution for fast bioimaging. Nature Methods. Feb. 2024;21(2):322-30. (Year: 2024).*

* cited by examiner

*Primary Examiner* — Clifford Hilaire
(74) *Attorney, Agent, or Firm* — Douglas J. Ryder; Ryder, Mazzeo & Konieczny LLC

(57) ABSTRACT

A method for interpolating high resolution intermediate images is suggested. The method relies on an iterative approach exploiting in a current interpolation step additional information contained in up sampled intermediate images from a previous interpolation step. In this way the proposed method overcomes shortcomings of known interpolation methods regarding the interpolation of high-resolution images. A broadcast production system leveraging the proposed interpolation method allows for replay of scenes selected by a production director in slow-motion without requiring dedicated slow-motion cameras.

14 Claims, 10 Drawing Sheets

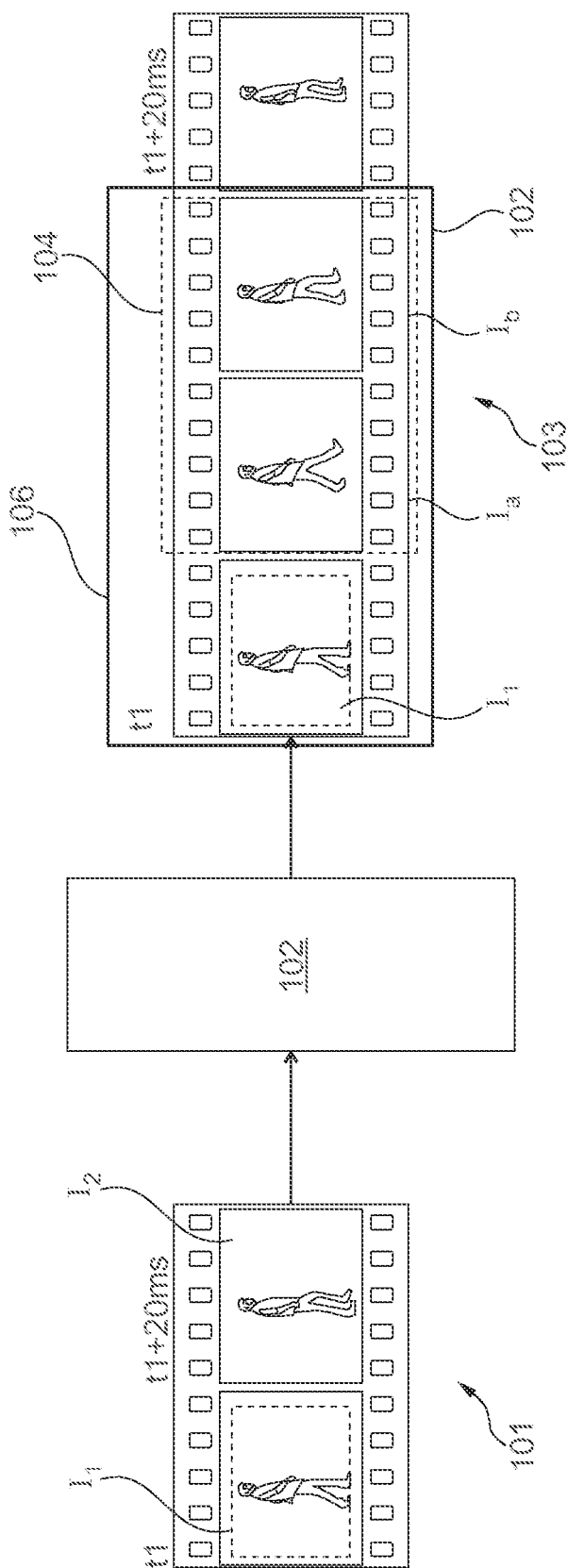
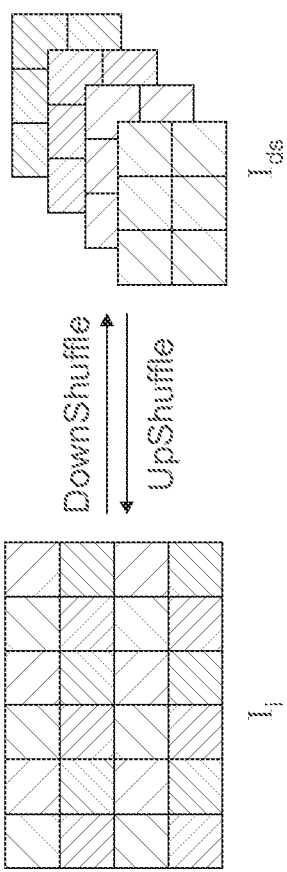
Fig. 1
Fig. 3

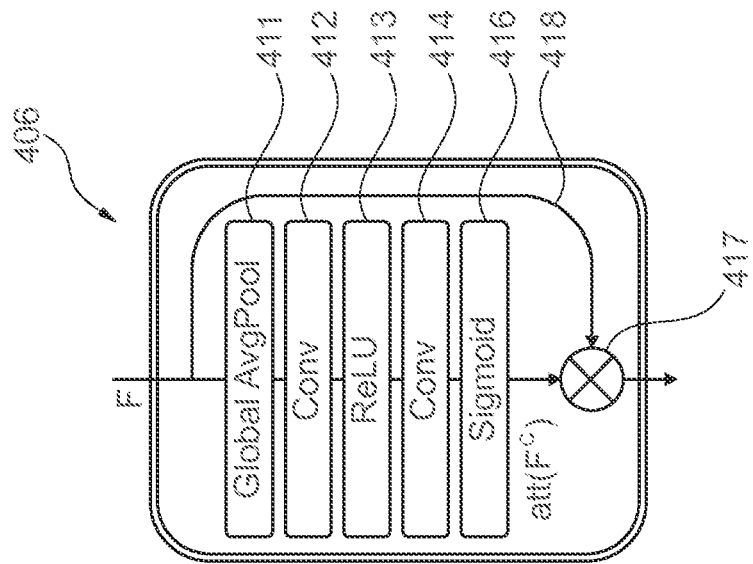
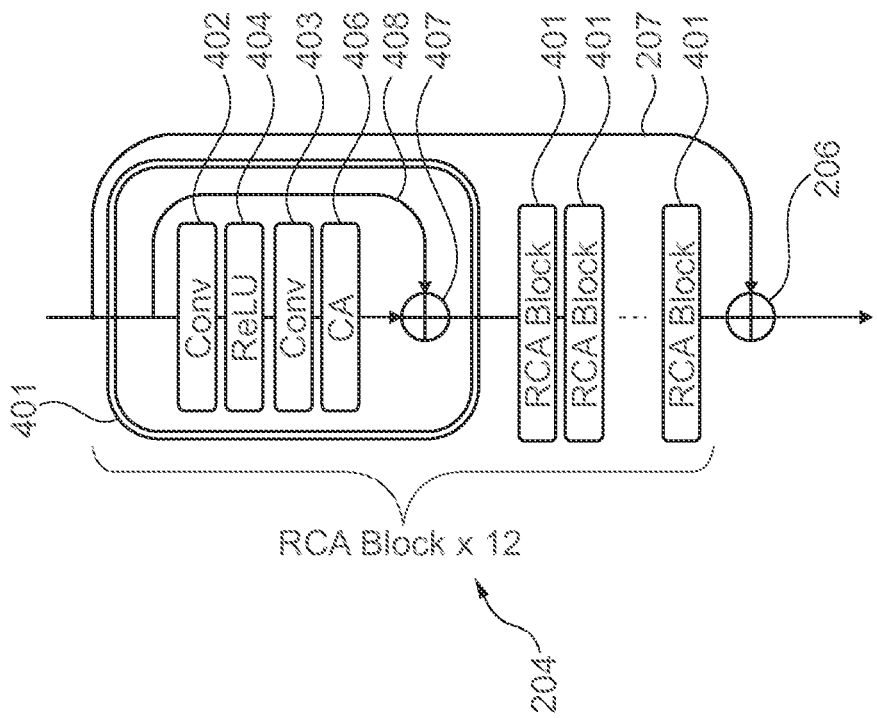
Fig. 4B
Fig. 4A

METHOD AND SYSTEM FOR VIDEO FRAME INTERPOLATION

FIELD

The present disclosure relates to a method and a system for interpolating intermediate images in a video stream between two consecutive images in the stream.

BACKGROUND

In broadcast productions covering a sports event, multiple cameras capture the event from different perspectives. To this end, the cameras are installed at different locations in a sports venue. All camera streams are recorded on a video production or replay server allowing an operator to go back in time and make a live playback of the clip showing an action of interest that just happened. The coverage of the sports event is delivered to the viewers as a broadcasted program output stream.

The playback is usually done in slow motion, meaning that the images are played out at a lower image frame rate than their acquisition frame rate. Best slow-motion quality is achieved with high-speed cameras, so-called super slow-motion cameras (SSM cameras). SSM cameras exist for multiple speeds, e.g. 2×, 3×, and 4×, wherein single speed denominated with a frame rate factor 1× corresponds to the frame rate of the program output stream having a frame rate of 50 frames per second (FPS) or 59.94 FPS. The frame rate factors 2×, 3×, and 4× are also referred to as frame rate multipliers. Hence, SSM cameras output a camera stream having a frame rate that is a multiple of the frame rate of the program output stream. For instance, a clip recorded by an SSM camera producing a video stream with a 3×50 FPS frame rate can be played back at ⅓ of the original capturing speed (that is a frame rate of 50 FPS) and still provides smooth transitions between consecutive image frames. Since it is unpredictable where an interesting event worthwhile to be replayed in slow-motion occurs, it would be a straight-forward approach to install a multitude of SSM cameras at the sports venue. However, SSM cameras are a scarce resource because they are expensive, require a high bandwidth for data transmission to the replay server and, therefore, occupy multiple server channels.

For instance, one server channel of the video production server can ingest an uncompressed camera stream at normal reproduction frame rate, e.g with 50 FPS. Hence, an SSM camera operating at a 3 times higher frame rate (3×) outputs a video stream with 3×50 FPS and requires three server channels to transmit the video stream and enable recording of the video stream from the SSM camera at the replay server. As a result, SSM cameras are too large, too fragile, and too expensive to be installed at every location in the sports venue where slow-motion replay might potentially bring value to a broadcast production. Given this situation, broadcast production companies seek for alternative solutions for providing slow-motion replays with variable frame rate multipliers for every type of camera in every broadcast production. Notably, there is a desire to provide slow-motion replays of camera streams that have been captured with non-SSM cameras.

A known approach for solving this problem is to calculate intermediate image frames between two consecutive video frames of a normal camera outputting the video stream at a frame rate corresponding to the production frame rate, e.g. the video stream with 50 FPS. The process of calculating intermediate image frames is also referred to as "video frame interpolation".

In most of the cases, video frame interpolation depends on an accurate optical flow estimation, which describes for every pixel in an image how the pixel moves between a first and a second anchor image. The first and second anchor images are consecutive images in the camera stream. Knowledge about the optical flow enables video frame interpolation between the first and the second anchor images. Video frame interpolation constructs initial estimates of intermediate frames by image warping with the estimated optical flow and, subsequently, refining the initial interpolation result through high-level processing using a deep neural network that helps improving the initial intermediate image estimation. An accurate optical flow estimation leads to a successful quantitative and qualitative performance of video interpolation. In this sense an optical flow estimation is an explicit estimation of movement of each pixel between two images. A disadvantage of this approach is that the optical flow estimation incurs substantial computational cost in terms of time and memory. In addition to that, it is important to note that no optical flow estimator is perfect and, thus, the optical flow estimator limits the performance of the video frame interpolation.

In a paper of Choi et al. [1] an alternative approach is proposed. This process is also known as "channel attention is all you need" (CAIN). CAIN is a deep learning method based on convolutional neural networks. The CAIN approach replaces the use of optical flows with simple feature map transformations by gradually distributing the information about motion into multiple color channels and constructing a transformed feature map. The feature map is combined with a channel attention to capture the variations between the anchor frames including motion. High quality intermediate video frames are synthesized without explicitly determining motion estimation or optical flows. The CAIN approach directly outputs intermediate images without explicit motion estimation for each pixel. In this sense the CAIN approach is an end-to-end approach, in which explicit motion estimation is replaced by implicit motion estimation.

One drawback of CAIN is its inability to handle arbitrary frame rate multipliers because the frame rate multiplier is determined during training of the neural network and can only be changed by training the neural network all over again. Consequently, a production director is constrained in the sense that only one speed of slow motion is available, even if this speed is not the most suitable for a given scene to be replayed. Furthermore, it has been found in practice that CAIN is not performing well when working with high resolution images (e.g., 4 k content). In simple words, the intermediate high-resolution images generated with the CAIN approach do not look nice. The disadvantage of having to retrain the neural network for each frame rate multiplier seems to be acceptable for many broadcast productions. However, poor image quality is a real problem for broadcast industry since in video production mainly images with 1920×1080 (full HD) or 3840×2160 (4 k) pixels are processed.

Taking this as a starting point there remains a need for a method and an apparatus for generating intermediate image frames for a high-resolution video stream without relying on the estimation of an optical flow.

SUMMARY

According to a first aspect the present disclosure suggests a method for interpolating intermediate images between two consecutive anchor images in a video input stream. The method comprises providing the images of the video input stream in a first and a second image resolution, wherein the second image resolution is higher than the first image resolution;

receiving the anchor images in the first image resolution in a first neural network;

processing the anchor images in the first neural network trained for interpolating one or several first intermediate image(s) in the first image resolution;

upscaling the first intermediate image(s) to the second image resolution;

receiving the upscaled first intermediate image(s) and the anchor images in the second image resolution in a second neural network, processing the anchor images in the second image resolution and the upscaled first intermediate image(s) in the second neural network, which is trained for interpolating one or several second intermediate image(s) in the second image resolution.

The method iteratively interpolates high resolution intermediate images and exploits for the interpolation additional information contained in up sampled intermediate images from a previous interpolation. In this way the proposed method overcomes the shortcoming of the known CAIN approach, which is not appropriate for broadcast applications because the known CAIN approach does not meet the quality expectations for high resolution images in the broadcast environment.

Generally speaking, the iterative approach of the suggested method comprises providing the images of the video input stream in 1 to n different image resolutions, wherein the first image resolution is the lowest image resolution and the n-th image resolution is the highest image resolution, wherein k is an integer between 1 and n, which denotes a level of the image resolution and a level of the neural network associated with the corresponding image resolution;

upscaling an intermediate image(s) having a (k−1)th image resolution to a k-th image resolution;

receiving the upscaled intermediate image(s) and the anchor images in the k-th image resolution as input for a k-th neural network;

processing the anchor images in the k-th image resolution and the previous level's upscaled intermediate image(s) in the k-th neural network, which is trained for interpolating one or several intermediate image(s) in the k-th image resolution.

The parameter n is an integer ≥2. In other words, the proposed method involves as many iterative interpolations as necessary to obtain intermediate images with high image resolution of good quality. The underlying general idea of using upscaled intermediate images of a lower resolution in the next iteration of the interpolation is independent of the number of iterations.

In a specific embodiment of the method for interpolating intermediate images, the method comprises transforming the anchor images into a different format having fewer horizontal (H) and fewer vertical (V) pixels and more channels (C), such that the transformed images are represented as another three-dimensional tensor having the format $H/s \times W/s \times s^2 C$.

In an advantageous embodiment of the method processing anchor images and/or one or several intermediate images includes generating a single composed feature map.

If applicable, generating the single composed feature map may comprise concatenating the two anchor images and previous level's upscaled intermediate image(s) in a channel wise manner.

In a further embodiment of the method the neural network is trained to produce an output feature map that contains all channels of at least one intermediate image.

In this case and if more than one intermediate images shall be interpolated the method may further comprise decomposing the output feature map into at least two or more intermediate images.

According to a second aspect the present disclosure suggests a computer program product including program code, which implements the method according to one of the preceding claims when the program code is executed on a computer. In practical applications the proposed method for interpolating intermediate images will be implemented as a computer program executed by either a stand-alone computer device, a server that also handles other tasks in the broadcast production or a cloud service that provides the interpolation of intermediate images as a service on demand. The latter may have cost advantages because the service must be paid only on an as needed basis.

According to a third aspect, the present disclosure suggests a broadcast production system comprising a plurality of video cameras, a vision router, a replay server, and a vision mixer. Each video camera generates a video stream with a first frame rate, which are supplied to the vision router transferring the camera streams to the vision mixer and the replay server. The replay server stores all camera streams and enables selection of one of the camera streams for replay. The vision mixer generates a program output stream. The broadcast production system further comprises an interpolation device that interpolates one or several intermediate images between two consecutive images in the video stream selected for replay to create a slow-motion video stream with a second frame rate that is higher than the first frame rate.

Advantageously the proposed broadcast production system allows for replay of scenes selected by a production director in slow-motion without requiring dedicated slow-motion cameras. The basis for the slow-motion replay stream is a camera stream that has the same frame rate as the program output stream. The additional intermediate video frames are interpolated by the interpolation device. The interpolation device conveys a high degree of flexibility to the broadcast production system regarding the availability of slow-motion replays from various camera perspectives without incurring the cost for a plurality of dedicated slow-motion cameras.

In an advantageous embodiment of the broadcast production system the slow-motion video stream is provided to the vision mixer. The vision mixer allows for integrating the slow-motion replay stream into the program output stream of a broadcast production.

In one embodiment of the broadcast production system, the interpolation device is integrated into the replay server.

In an alternative embodiment of the broadcast production system, the interpolation device is implemented as a cloud service. By relying on a cloud service, the computer power can be scaled to meet the needs of a specific broadcast production without requiring investing in hardware.

In a preferred embodiment of the broadcast production system, the interpolation device is configured to implement the method according to the first aspect of the present disclosure.

In a further advantageous embodiment of the broadcast production system, the interpolation device comprises a convolutional neural network. Convolutional neural networks have been found to be very effective to analyze images including analyzing movement within consecutive images.

BRIEF DESCRIPTION OF THE DRAWINGS

Exemplary embodiments of the present disclosure are illustrated in the drawings and are explained in more detail in the following description. In the figures, the same or similar elements are referenced with the same or similar reference signs. It shows:

FIG. 1—a schematic diagram illustrating the principle of video interpolation;
FIG. 3—a schematic diagram illustrating the principle of up- and down-shuffling;
FIG. 4A—a block diagram of a residual group;
FIG. 4B—a block diagram of the channel attention module.

Figure 2:
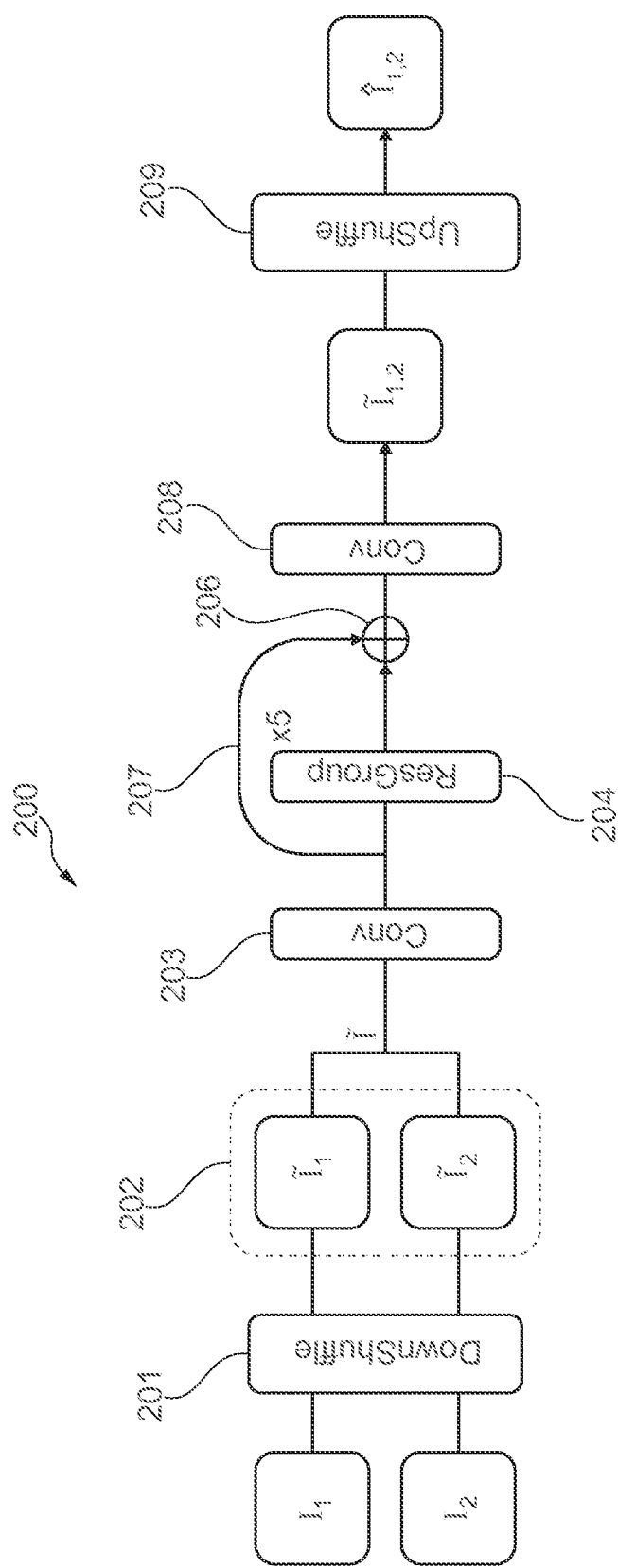
FIG. 2—a schematic diagram of a CAIN network.

In the figures the same or similar components are labelled with the same or similar reference signs.

DETAILED DESCRIPTION

In the following a detailed description of embodiments of the present invention is provided.

Video Frame Interpolation

FIG. 1 illustrates the principle of video frame interpolation. FIG. 1 displays two image frames $I_1$ and $I_2$ of a camera stream 101 having a frame rate of 50 FPS. If provided to a display device, the display of image In begins at time t1 and the display of image $I_2$ 20 ms later. At other frame rates than 50 FPS, the time shift between image $I_1$ and $I_2$ is different than 20 ms. The camera stream 101 is provided as an input stream to a processing stage 102 that generates an output stream 103. The output stream 103 contains each image contained in the input stream 101 and, in addition, for each input image from the camera stream 101 two interpolated intermediate images denoted as $I_a$ and $I_b$. The interpolated images are highlighted with a dashed frame 104. Consequently, the output stream 103 contains for each image from the input camera stream 101 three images in the output stream 103, which, therefore, has a framerate of 150 FPS. Specifically, the anchor image $I_1$ of the input stream 101 is supplemented with intermediate images $I_a$ and $I_b$. The triplet of these images $I_1$, $I_a$ and $I_b$ is highlighted in FIG. 1 with a frame 106. The interpolation of two intermediate images by the processing stage 102 is only a representative example. In other embodiments the processing stage 102 generates only one or more than two intermediate images. The framerate of the output stream 103 varies accordingly. But for the sake of simplicity the following description will be limited to one or two intermediate images.

The goal of video frame interpolation is to synthesize one or several intermediate image frames based on two given anchor video frames $I_1$ and $I_2$, wherein in an ideal situation the intermediate images correctly reflect the movement between the anchor image frames. The method proposed by the present disclosure applies a simple feature map transformation (also known as pixel shuffle [1]) followed by an interframe event modeling. The interframe event modeling involves channel attention, which will be explained further below.

The camera stream 101 is provided by a high definition (HD) or 4 k video camera (not shown in the figures). Lower resolutions of the camera stream 101 can be obtained by a straightforward bilinear interpolation performed on the video production server providing the desired lower resolution camera stream. Obviously, also the camera could provide other versions of the camera stream with lower image resolution such that different camera streams with different image resolutions are available for processing. Alternatively, the down sampling the camera stream 101 could be executed in a dedicated device providing other versions of the camera stream with lower image resolutions.

CAIN Network Architecture

FIG. 2 shows a schematic block diagram of a network architecture 200 which is also known as CAIN network architecture. The CAIN network 200 serves as a starting point for the method for frame interpolation according to the present disclosure.

Two input video frames $I_1$ and $I_2$ are processed in a down shuffle processing stage (DS) 201 performing a down-shuffling operation fDS. An image I, that can stand for image $I_1$ or $I_2$, is represented as a tensor I of size H×W×C, wherein H and W are the number of pixels in vertical and horizontal direction, respectively, and C represents the number of color channels. In mathematical terms this means that tensor $I \in R^{H \times W \times C}$. The down shuffle operation reduces the spatial dimension of the image I by a factor of s, which is a selectable factor to produce a down-shuffled image $\tilde{I}_1$ or $\tilde{I}_1 = fDS(I1)$, where fDS represents the down shuffle operation and $\tilde{I}_1 \in R^{H/s \times W/s \times s^2 C}$.

The down shuffle operation fDS applies several different switch variables and generates down sampled images corresponding to the individual switch variables. The inverse operation is called up shuffling.

FIG. 3 illustrates both operations when s=2. The starting point is an initial image $I_t$ represented as a 4×6×1 tensor having only a single channel. The down-shuffle operation converts the image into a down-shuffled image $I_{ds}$ represented as a 2×3×4 tensor. Hence, the down-shuffled image $I_{ds}$ is reduced in its spatial dimensions but contains more channels. The up-shuffle operation is the inverse operation to the down shuffle operation.

With reference back to FIG. 2, the input images $I_1$, $I_2$ have three channels (C=3), namely the color channels red (R), green (G), and blue (B). The input images $I_1$, $I_2$ are provided to a down shuffle stage 201, which down shuffles the input images to generate images $\tilde{I}_1$, $\tilde{I}_2$, respectively.

In a specific example the down and the inverse up shuffle operations are executed with a factor of s=8. Thus, when starting from input images $I_1$, $I_2 \in R^{H \times W \times 3}$ the down-shuffled images are $$\tilde{I}_{1,2} \in R^{H/8 \times W/8 \times 192}, \text{ wherein } 192=3 \times 64=3 \times 8^2.$$

The down shuffle stage 201 processes input images $I_1$, $I_2$ in parallel and outputs the down-shuffled images $\tilde{I}_1$, $\tilde{I}_2$, to processing stage 202 concatenating the down-shuffled images $\tilde{I}_1$, $\tilde{I}_2$ in channel direction, which means that the channels 1 . . . n of image $\tilde{I}_1$ are concatenated followed by the channels 1 . . . n of image $\tilde{I}_2$ to generate image $\tilde{I}$. Image $\tilde{I}$ consequently consists of 384 channels. Convolution layer 203 applies a 3×3 convolution to image I and reduces the number of channels of output image back to 192 channels. The convoluted image with 192 channels provided by convolution stage 203 is processed by a sequence of five residual groups 204. Each residual group 204 contains 12 residual channel attention (RCA) blocks 401 (FIG. 4A). The output of the last residual group 204 is a first input to a summing stage 206 which receives as a second input the input of the first residual group 204 provided by a residual connection 207. The output of the summing stage 206 is provided as an input to a final convolution layer 208 that performs an inverse processing compared with convolution layer 203 to generate an intermediate image $\tilde{I}_{1,2}$ containing 192 channels. Image $\tilde{I}_{1,2}$ is up-shuffled in up-shuffling stage 209 to finally obtain intermediate image $\hat{I}_{1,2}$, which is in the same format as anchor images $I_1$, $I_2$. In the embodiment shown in FIG. 2, the intermediate image $\hat{I}_{1,2}$, represents the situation that is timewise in the middle between the anchor images $I_1$, $I_2$. The CAIN network architecture 200 comprising all components 201-209 forms a neural network. The CAIN network architecture 200 is trained with large amount of image triplets containing two input images (the anchor images $I_1$, I2) and an output image that is timewise in the middle between the anchor images $I_1$, $I_2$. In this way the network is trained to provide an output image that is timewise in the middle of the anchor images $I_1$, $I_2$ in the described sense.

With reference to FIG. 4A, each RCA block 401 contains two 3×3 convolution layers 402, 403 with a rectified linear unit (ReLU) 404 in between. Convolution layer 403 is followed downstream in data flow direction by a channel attention (CA) module 406. The output of CA module 406 is a first input to a summing stage 407 that receives as a second input the input of the RCA block 401 to form a residual connection 408. The summing stage 407 performs an element wise summing of its first and second (FIG. 1) inputs and provides its output as an input to the next RCA block 401. The output of the last RCA block 401 in the sequence of the five RCA blocks is summed in the summing stage 206 with the input of the first RCA block 401.

The CA module 406 is shown in greater detail in FIG. 4B. The CA module 406 receives a feature map F corresponding to a tensor, wherein $F \in R^{H' \times W' \times C'}$. The CA module 406 executes as a first step a global average pooling in a pooling stage 411 to aggregate the statistics of the channel to obtain a descriptor Fc, wherein $Fc \in R^{1 \times 1 \times C'}$. A following 1×1 convolution layer 412 assigns a selectable weight W0 and a ReLU activation function 413 is used. The output of ReLU 413 is provided as input to 1×1 convolution layer 414 assigning a weight W1 to the output of ReLU 413. The convolution layer 414 is followed by a sigmoid function stage 416 outputting an attention weight Att(Fc). These layers allow capturing nonlinear interchannel relationships. The attention weight is calculated as $$Att(Fc)=s(W1*(ReLU(W0*Fc))),$$

where s denotes a sigmoid function and W0 and W1 are weights of the two 1×1 convolution layers 412 and 414, respectively. High channel attention scores correspond to regions with large motion and the neural network focuses on these regions with high weights. The final output of the CA module 406 is then calculated as an element wise product of the input feature F and the obtained attention weight att(Fc) in multiplication stage 417. To this end, the multiplication stage 417 receives the channel attention Att(Fc) as a first factor and the input feature F as a second factor via a connection 418. The output of multiplication stage 417 represents the first input of the summing stage 407 (FIG. 4A). This allows the neural network to focus on important regions in the image, e.g., the ones with high motion.

Concept of Up Sampling CAIN (UCAIN) Approach

Figure 5:
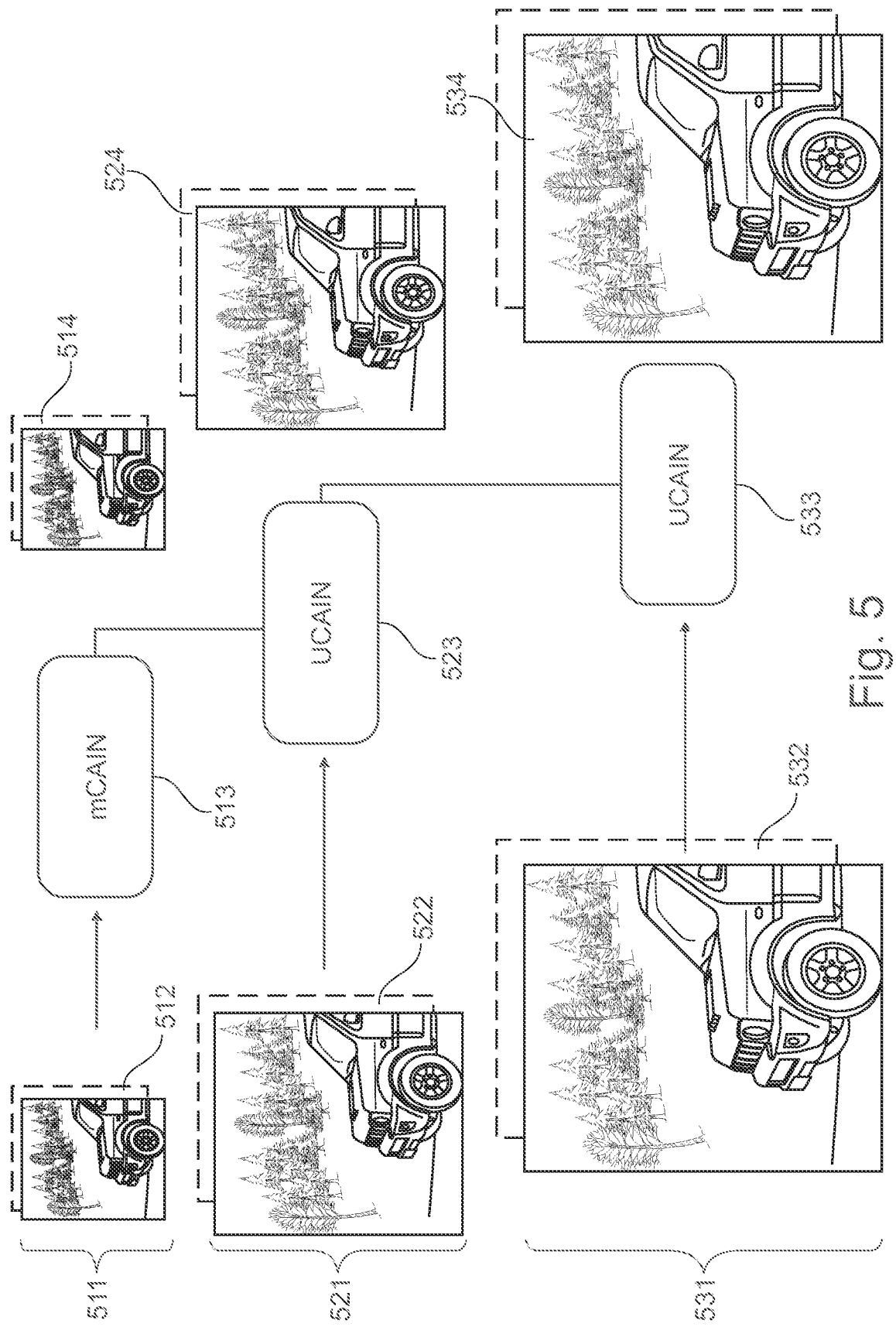
FIG. 5—a schematic diagram illustrating a pyramidal approach for image interpolation according to the present disclosure.

The network architecture illustrated in FIG. 2 is configured to calculate a single intermediate image $\hat{I}_{1,2}$ that is timewise in the middle between the anchor images $I_1$, $I_2$. The network shown in FIG. 2 is known in the literature as CAIN architecture ("Channel Attention Is all you Need" [1]). The CAIN architecture is known to work well for low resolution images but not for high resolution images having 1920× 1080 (full HD) or 3840×2160 (4 k) pixels. To overcome this shortcoming, the present disclosure suggests a processing system implementing a layered or pyramidal approach which essentially is a stepwise calculation of interpolated intermediate images, wherein in each step the resolution of the input and interpolated images increases. This pyramidal approach alleviates the shortcoming of the CAIN architecture and is visualized in FIG. 5. As shown, the pyramidal approach comprises three network layers 511, 521, and 531 corresponding to images with low, medium, and high resolution, respectively. The anchor images $I_1$, $I_2$ for each layer are the same except of their resolution. The pyramidal begins on the first network layer 511 with low resolution anchor images 512, which are processed in a network 513 to interpolate two or more intermediate images 514. In FIG. 5 the second anchor and intermediate images are only indicated as a dashed frame for the sake of clarity. In contrast to the CAIN architecture, which can only interpolate a single intermediate image, the network 513 is also capable of interpolating two and more intermediate images. The network 513 is therefore labeled as "modified CAIN" (mCAIN). Of course, the network 513 can also calculate only a single intermediate image. But in this case, it is not different than the conventional CAIN network.

On the second network layer 521 medium resolution anchor images and up-sampled versions of the intermediate images 514 are used as input 522 for a network 523 calculating medium resolution intermediate images 524. The up-sampled versions of the intermediate images 514 have the same medium resolution as the medium resolution anchor images. In view of the up-sampling aspect, the network 523 is also labeled as "up-sampling CAIN (UCAIN)". Finally, on the third network layer 531 high resolution anchor images 532 and up-sampled versions of intermediate images 524, which have the same resolution as the high-resolution anchor images, are provided to a UCAIN network 533 generating high resolution intermediate images 534. In principle, in other embodiments the pyramidal approach is implemented with only two layers or with more than three layers.

For explaining the present disclosure, the pyramidal approach is described with two intermediate images. However, the pyramidal approach is not limited to a specific number of intermediate images including the interpolation of a single intermediate image which corresponds to a video stream with a frame rate multiplier 2×. For calculating more than one intermediate image, the network architecture 200 needs to be modified.

Modified CAIN (mCAIN) Architecture

Figure 6:
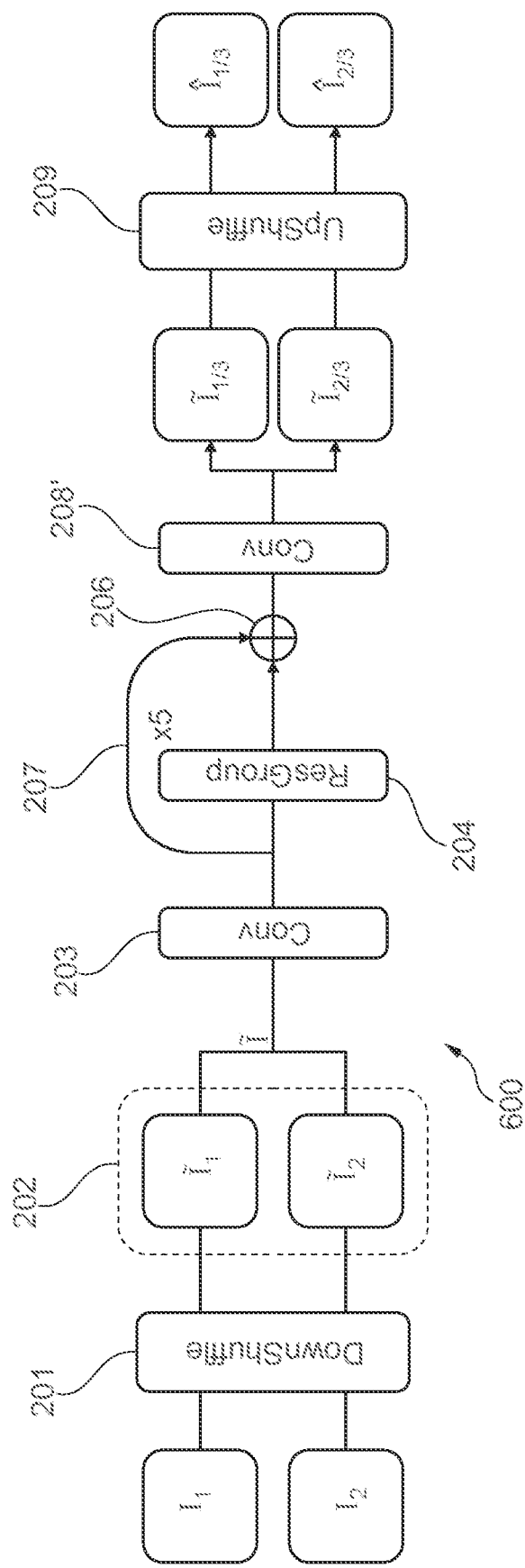
FIG. 6—a block diagram of a modified CAIN network.
Figure 7:
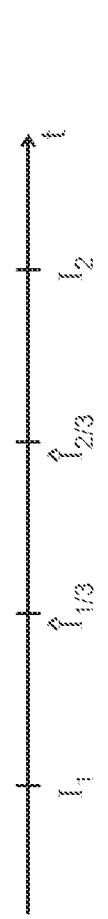
FIG. 7—a timing diagram.

FIG. 6 shows a modified network architecture denoted as modified CAIN (mCAIN) network 600 that is adapted for calculating two intermediate images $I_a$, $I_b$ as shown in FIG. 1. The signal flow in the network 600 in FIG. 6 is from left to right. The first main difference is a modified convolution layer 208' that outputs twice as many channels as convolution layer 208 of the network shown in FIG. 2, i.e. the output of convolution layer 208' contains 384 channels which are arranged into two intermediate images denoted as $\tilde{I}_{1/3}$ and $\tilde{I}_{2/3}$. The input convolution 203 encodes the two input images into a representation that cases the work of the network to interpret motion. This representation is iteratively refined by the residual groups 207, until obtaining an intermediate representation that contains the information necessary to reconstruct the two interpolated frames. Finally, the output convolution layer 208' decodes the intermediate representation into 384 channels, half of which are used for each image $\tilde{I}_{1/3}$ and $\tilde{I}_{2/3}$. The intermediate images $\tilde{I}_{1/3}$ and $\tilde{I}_{2/3}$ are up-shuffled in up shuffle stage 209 outputting two intermediate images $\hat{I}_{1/3}$ and $\hat{I}_{2/3}$ having the same format as anchor images $I_1$, $I_2$. In a timewise direction the intermediate images $\hat{I}_{1/3}$ and $\hat{I}_{2/3}$ are equidistant from anchor image $I_1$ and $I_2$, respectively, and from one another as it is schematically illustrated in FIG. 7. The network architecture shown in FIG. 6 is called modified CAIN (mCAIN) architecture since it uses as an initial starting point for image interpolation only the two anchor images $I_1$, $I_2$ like in the original CAIN network architecture 200 displayed in FIG. 2. The mCAIN network 600 is an embodiment of the network 513 shown in FIG. 5 that works on the basis of low-resolution images. The low-resolution intermediate images $\hat{I}_{1/3}$, $\hat{I}_{2/3}$ are up sampled to a higher resolution, for instance by bilinear interpolation, to serve as additional information input for calculating medium resolution intermediate images in the UCAIN network 523.

UCAIN Network Architecture

Figure 8:
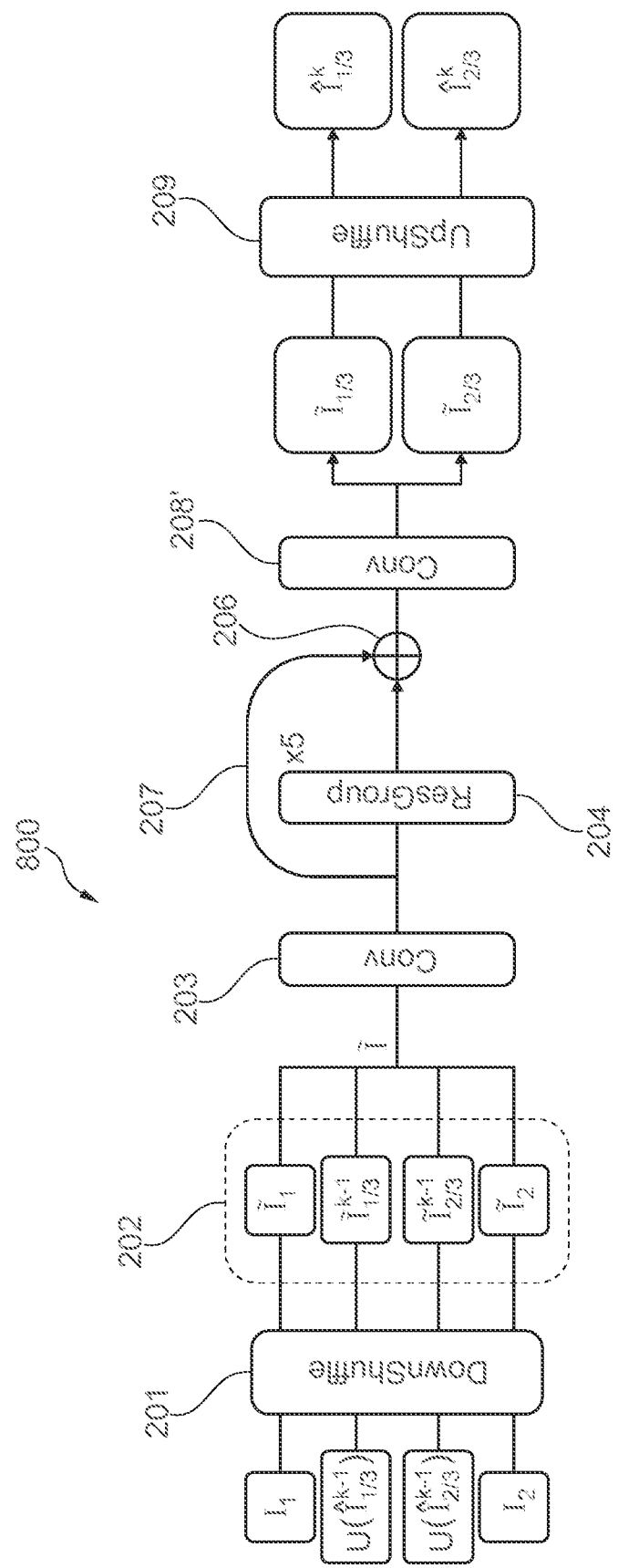
FIG. 8—a block diagram of an upsampling CAIN network.

FIG. 8 illustrates one embodiment 800 of an architecture of UCAIN network 523. The signal flow in the network 800 in FIG. 8 is from left to right. A down-shuffle stage 801 receives four medium resolution images, namely two anchor images $I_1$, $I_2$ and two up-sampled intermediate images $U(\hat{I}_{1/3}^{k-1})$, $U(\hat{I}_{2/3}^{k-1})$. The up-sampled intermediate images $U(\hat{I}_{1/3}^{k-1})$, $U(\hat{I}_{2/3}^{k-1})$ are based on the low-resolution intermediate images $\hat{I}_{1/3}$ and $\hat{I}_{2/3}$ generated by the network 513 in the first network layer 511. The superscript "k−1" on the up-sampled intermediate images $U(\hat{I}_{1/3}^{k-1})$, $U(\hat{I}_{2/3}^{k-1})$ indicates that the basic intermediate images $\hat{I}_{1/3}$, $\hat{I}_{2/3}$ were interpolated one layer below the current layer, namely on the layer 513 in FIG. 5.

The down-shuffled images $\tilde{I}_1$, $\tilde{I}_2$, $\tilde{I}_{1/3}^{k-1}$, $\tilde{I}_{2/3}^{k-1}$ are provided to processing stage 802 concatenating the down-shuffled images $\tilde{I}_1$, $\tilde{I}_2$, $\tilde{I}_{1/3}^{k-1}$, $\tilde{I}_{2/3}^{k-1}$ in channel direction to generate image $\tilde{I}$. Image $\tilde{I}$ consequently consists of 768 channels. Convolution layer 203 applies a 3×3 convolution to image $\tilde{I}$ and reduces the number of channels of output image to 192 channels. The convoluted image with 192 channels provided by convolution stage 203 is processed by a sequence of the five residual groups 204. Convolution stage 208' outputs an image with 384 channels, which are arranged into intermediate images $\tilde{I}_{1/3}$ and $\tilde{I}_{2/3}$ as described in connection with FIG. 6. The intermediate images $\tilde{I}_{1/3}$, $\tilde{I}_{2/3}$ are up-shuffled in up shuffling stage 209 to create two second intermediate images $\hat{I}_{1/3}^k$, $\hat{I}_{2/3}^k$ having the same format and resolution as the anchor images $I_1$, $I_2$ at the input of down-shuffle stage 201. The superscript "k" indicates the current layer 521 in the pyramidal CAIN approach shown in FIG. 5. In this nomenclature intermediate images interpolated by the layer 531 in FIG. 5 would receive the superscript "k+1".

After up-sampling to high resolution the second intermediate images $\hat{I}_{1/3}^k$, $\hat{I}_{2/3}^k$ can be utilized jointly with high resolution anchor images $I_1$, $I_2$ as an input to a further UCAIN network 533 for interpolating high resolution intermediate images. One embodiment of UCAIN network 533 has the same architecture as network 800.

Figure 9:
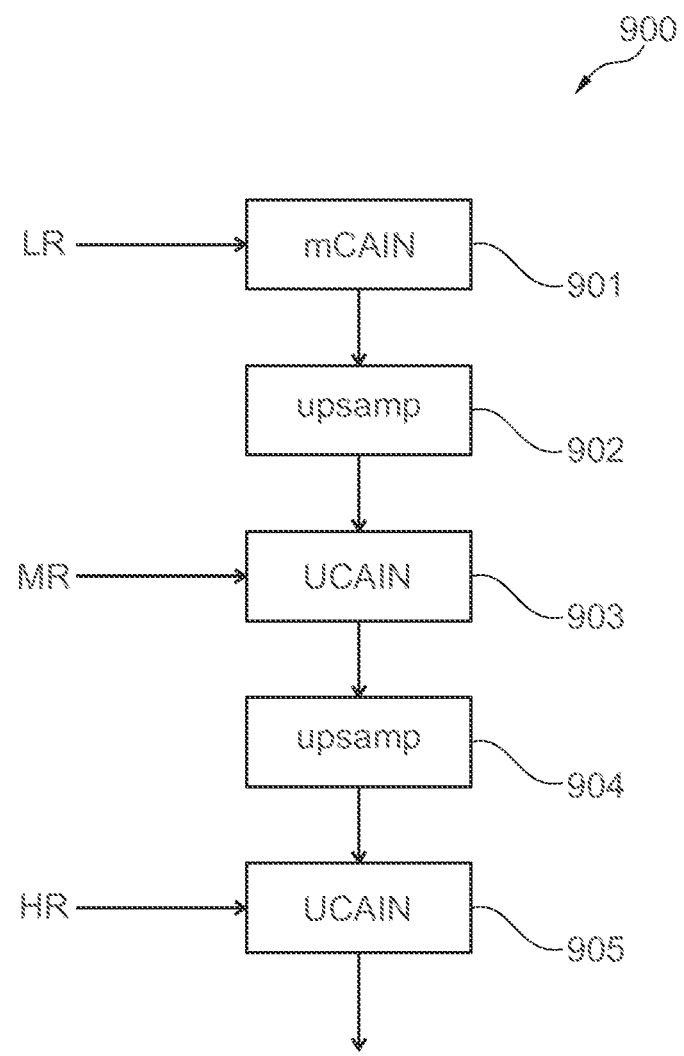
FIG. 9—a block diagram of a system for implementing the pyramidal approach for image interpolation according to the present disclosure.

A block diagram shown in FIG. 9 sets out a system 900, which implements the described iterative pyramidal CAIN approach. The system 900 interpolates or calculates high resolution intermediate images starting from low resolution anchor images. A modified mCAIN network 901 receives two low-resolution anchor images LR and outputs low-resolution intermediate images to an up-sampling stage 902 up-sampling the low-resolution intermediate images to medium resolution intermediate images. In a specific embodiment bi-linear interpolation is used to generate the medium resolution intermediate images. The up-sampled medium resolution intermediate images are provided to a UCAIN network 903 that receives as further input two medium resolution anchor images MR. The medium resolution anchor images MR have the same image content as the low-resolution anchor images LR. The only difference between low resolution anchor images LR and medium resolution anchor images MR is that the medium resolution anchor images MR have a higher image resolution. The UCAIN network 903 outputs medium resolution intermediate images to a further up-sampling stage 904 up-sampling the medium-resolution intermediate images to high-resolution intermediate images. The up-sampled high-resolution intermediate images are provided to a UCAIN network 905 that receives as further input to high-resolution anchor images HR and finally outputs high-resolution intermediate images. The high-resolution anchor images HR have the same image content as the medium resolution anchor images MR. The only difference between the two is a higher image resolution of the high-resolution anchor images HR compared with the medium resolution anchor images MR.

Even though the system 900 is described with two UCAIN networks 903, 905, other embodiments of systems implementing the iterative approach for interpolating high resolution intermediate images may comprise only one or more than two UCAIN networks.

The system 900 is configured to overcome the initially mentioned disadvantage of processing networks implementing the CAIN approach, namely poor image quality for image interpolation based on high resolution anchor images.

The low-, medium-, and high-resolution camera streams LR, MR, and HR, respectively, are either provided directly by a video camera used for the video production or by software means performing a bilinear interpolation. The software is executed on the same device that runs the software for video frame interpolation or on another device that can provide the required computational power.

Figure 10:
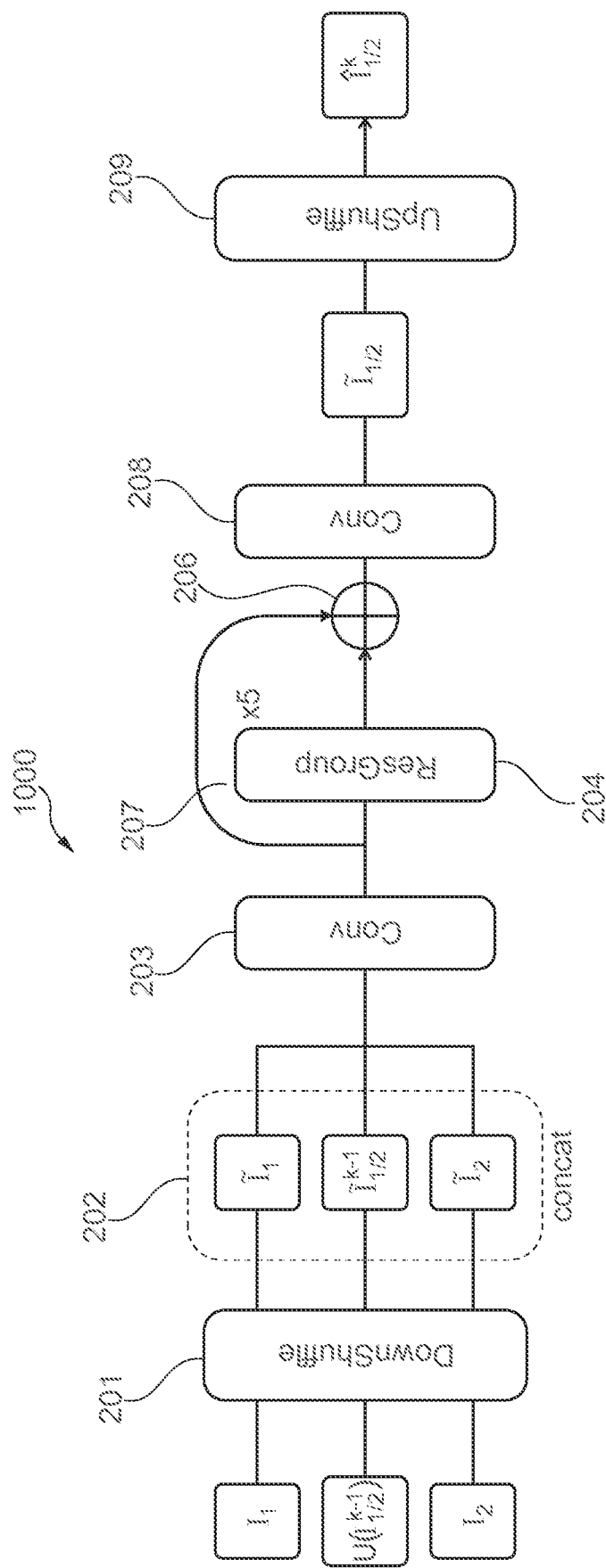
FIG. 10—a schematic block diagram of an alternative upsampling CAIN network.

FIG. 10 sets out and alternative architecture of a UCAIN network 1000. The UCAIN network 1000 is similar to network 800 with some important differences. A first difference is that in addition to the anchor images $I_1$, $I_2$ only a single additional upsampled intermediate image $U(I_{1/2}^k)$ is provided to the down-shuffling stage 201 instead of two upsampled intermediate images $U(\hat{I}_{1/3}^{k-1})$, $U(\hat{I}_{2/3}^{k-1})$ like in network 800. The upsampled intermediate image $U(I_{1/2}^k)$ has the same image resolution as the input images $I_1$, $I_2$ for UCAIN network 1000. The input images $I_1$, $I_2$, and $I_{1/2}{}^k$ are down-shuffled in down-shuffling stage 201. The down-shuffled images $\tilde{I}_1$, $\tilde{I}_2$, and $\tilde{I}_{1/2}{}^k$ are concatenated in processing stage to generate an image $\tilde{I}$ that has 576 channels under the assumption that the input images have 192 channels like in the other embodiments of networks 200 and 800. Convolution layer 203 reduces the number of channels of the processed image back to 192 channels. The subsequent processing of the image is the same as in network 200 such that the output of convolution layer 208 is an intermediate image $\tilde{I}_{1/2}$, which is up-shuffled in up shuffling stage 209 outputting an intermediate image $\hat{I}_{1/2}{}^k$ that has the same format and resolution than the input anchor images $I_1$, $I_2$.

For the purpose of illustration of the concept of the present disclosure, embodiments for the mCAIN and UCAIN networks have been described that generate one or two intermediate images. However, this concept is applicable as well for processing systems that interpolate three, four, or five intermediate images to implement frame rate multipliers 4×, 5×, and 6×. It is possible to conceive systems that interpolate even more intermediate images for even higher frame rate multipliers. However, there exist practical limits regarding the required computing power and processing time. For instance, the number of channels in the intermediate representation might also be a limit to the number of intermediate images a mCAIN network could output, as there might not be enough information in the intermediate representation to reconstruct many interpolated images.

Hardware Implementation

Figure 11A:
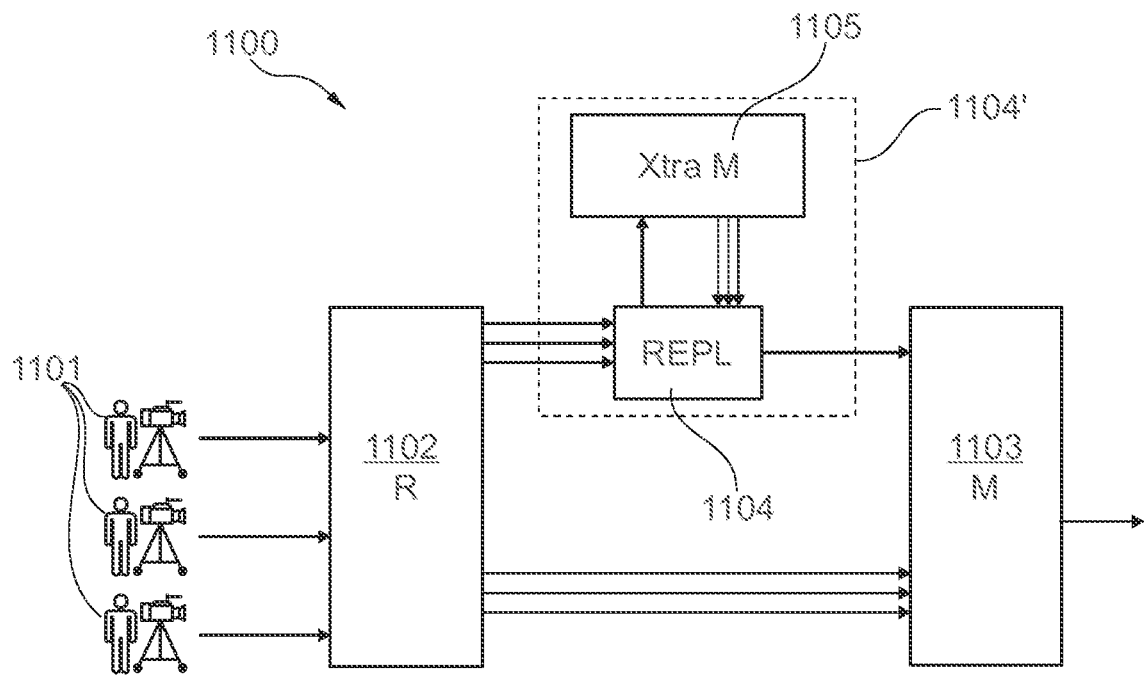
FIGS. 11A,11B—a schematic block diagram of a system for implementing the interpolation method according to the present disclosure.

FIG. 11A shows a schematic block diagram of a system 1100 for implementing the method for interpolating intermediate images according to the present disclosure. The system 1100 comprises a plurality of video cameras 1101 capturing for instance an event in a sports venue. The frame rate of the camera output streams is for example 50 FPS. The cameras are human operated, robotic, or virtual cameras or a combination thereof. The video streams from the video cameras 1101 (or briefly camera streams) are provided to a router (R) 1102 routing the camera streams, firstly, to a vision mixer (M) 1102 and, secondly, to a replay server REPL 1104 storing all incoming camera streams. The camera streams are communicated within the system via individual server channels providing sufficient bandwidth for transmitting the HD or 4 k camera stream of 50 FPS. The server channels are indicated in FIG. 11A by arrows. A production director may select one of the camera streams stored on the replay server 1104 for replay to present a particular scene again to the viewers of the program. The replay server 1104 outputs the selected camera stream as replay stream. The vision mixer 1103 is apt for composing a program output stream PO.

The vision mixer 1103 enables the program director to integrate video effects, stored video clips and/or text into the program output stream PO. Video effect and/or text generators and the required storage device for the video clips are not shown to avoid cluttering FIGS. 11A, 11B. Without any further measures the replay stream has the same frame rate as the camera streams. However, as mentioned in the introduction, it is sometimes very interesting for the viewer to watch a scene for example in a ball game with fast action in slow-motion. Therefore, a dedicated slow-motion apparatus or interpolation device (XtraM) 1105 is provided optionally allowing conversion of the camera stream selected for replay into a slow-motion replay stream with a higher frame rate than the original camera stream. In a practical embodiment the slow-motion apparatus or interpolation device is a computer executing a dedicated software program. For the creation of a slow-motion replay stream with a higher frame rate, the slow-motion apparatus 1105 interpolates intermediate images in the selected camera stream. For instance, if a frame rate multiplier 3× is chosen for the slow-motion apparatus 1105, two intermediate images are interpolated between two consecutive images of the camera stream. The slow-motion replay stream consequently has a frame rate of 150 FPS and requires three server channels for transmission from the slow-motion apparatus 1105 to the replay server 1104.

In one embodiment the slow-motion apparatus 1105 is a standalone device connected with the replay server 1104 this concept has the advantage that existing replay servers can be upgraded to with the slow-motion functionality without changing existing hardware in the studio or an OB van. In another embodiment, the slow-motion apparatus 1105 is integrated as a module in the replay server 1104' that integrates the slow-motion functionality and the storing of the camera streams in a single device. The integrated replay server 1104' is indicated in FIG. 11A with a dashed line.

Figure 11B:
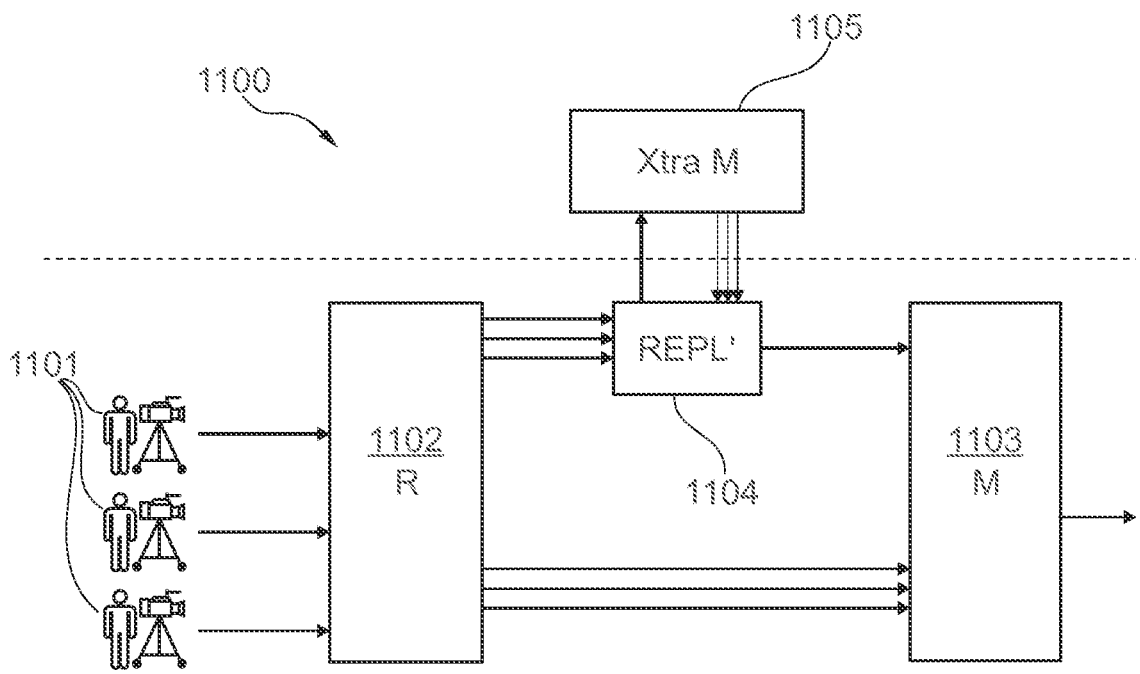

In yet another embodiment shown in FIG. 11B the slow-motion apparatus 1105 is implemented as a cloud server that is made available by a cloud service on demand. The dashed horizontal line in FIG. 11B separates the hardware in a studio or OB van and the slow-motion apparatus in the cloud. Hence, this concept allows providing the required computing power for generating slow-motion replay streams only as long as it is needed for a broadcast production. This concept can have cost advantages for some broadcasters.

In some embodiments the slow-motion apparatus 1105 hosts several neural networks adapted for interpolating different numbers of intermediate images for enabling different replay factors. For changing the frame rate multiplier for the replay stream the program director essentially just switches from one neural network to another one. This brings about additional flexibility for the program director to create a program output stream, which is appealing to the viewer of the program.

Training of the Neural Networks

The neural networks discussed above need to be trained with a large dataset comprising many samples of input data and target output data. Training of neural networks as such is known in the prior art. The target output data for frame interpolation is naturally present in video data, and so that no manual annotation is required.

a) Training of the mCAIN Neural Network

In the case of the neural network 600 implementing the functionality of the modified CAIN network (mCAIN), the input data are the two anchor images $I_1$, $I_2$. For training the neural network to realize a frame rate multiplier of 3× the anchor images $I_1$, $I_2$ are taken from a video stream 1200 shown in FIG. 12 with a frame rate of 150 FPS, which corresponds to three times the frame rate of the program output stream. Specifically, a first and a fourth image 1201, 1204 from the 150 FPS video stream 1200 are selected as anchor images $I_1$, $I_2$. The second and third image 1202, 1203 from the 150 FPS stream represent the target output data of the neural network. The output data generated by the neural network are compared with a target output data. Based on a comparison of the output data of the neural network with the target output data the parameters of the neural network are adapted such that the output of the neural network converges to the target data, namely the second and third image from the 150 FPS video stream. For the training of the mCAIN neural network high- and low-resolution images are used although in practical operation the mCAIN neural network 513 processes low resolution images. Training on a mix of images with different resolutions not only allows the network to be general enough to a mix of resolutions (FHD, UHD . . . ) but also enables better result in general.

It is noted, that for the training of the neural network to accomplish the frame rate multiplier of 150 FPS it is not mandatory to use training data (images) from a 150 FPS video stream, but it is helpful to achieve a good result because the target data are as close as possible to what is to be achieved by the neural network. Specifically, a video stream with a frame rate of 50 FPS could be used to train the neural network as well. The neural network can be trained for even higher frame rate multipliers by properly selecting the anchor images and the number of intermediate images in between. For instance, it is possible to select 2 anchor images such that there are 3 intermediate images for training the neural network to realize the frame rate multiplier of 4×. Since it is advantageous for the training of the neural network if between the anchor images is not too much movement, it is desirable to train the network with high frame rate camera recordings. The individual training of the neural network 600 and 513 (FIG. 5) represents first training step that is followed by a second step that is described in the following. Moreover, high frame rate camera recording can be down-sampled in a timewise manner to artificially create bigger motion and make the task of the network harder. This technique relates to a well-known concept for neural network training called data augmentation. Indeed, having a variety of motion intensity in the training dataset will make the network able to handle various type of motion at inference time. However, there is some limit on the type of motion we expect the network to be able to handle. If two consecutive frames are too different, it will be impossible to compute intermediate images and so we cannot drop too many frames in the video data, and we cannot use too low framerate video streams as training data.

b) Training of the Entirety of all Neural Networks Implementing Image Interpolation The systems 1100 for implementing the method for image interpolation according to the present disclosure comprise one mCAIN neural network and at least one UCAIN neural network and in particular two or more UCAIN neural networks. In any case and after the training of the mCAIN neural network 513 is accomplished, the entirety of all neural networks 513, 523, 533 are trained as a whole. This part of the training represents the second training step. In contrast to the individual training of the mCAIN network 513 in the training step in which high and low resolution training images are used, the neural networks 513, 523, 533 receive low-, medium- and high-resolution images, respectively. For the second training step the video stream with the same frame rate as in the first training step is used. Hence, in the presently discussed example the frame rate of the training image data is 150 FPS. The input data for the neural networks 513, 523, 533 are two anchor images $I_1$, $I_2$. Like in the previous first training step, first and the fourth image from this 150 FPS video stream are selected as anchor images $I_1$, $I_2$ in low-, medium- and high-resolution for the neural networks 513, 523, 533, respectively. The second and third image from the 150 FPS stream in low-, medium- and high-resolution represent the target output data of the corresponding neural networks 513, 523, and 533, respectively. The intermediate images predicted by the mCAIN neural network 513 are upscaled to medium-resolution and supplied as additional input data to the first UCAIN neural network 523. The intermediate images predicted by the first UCAIN neural network 523 are upscaled to high-resolution and supplied as additional input data to the following UCAIN neural network 533. The difference between the predicted intermediate images and the target intermediate images are compared to obtain information for adapting the weights applied in each neural network involved. In this way, the entirety of all neural networks 513, 523, and 533 is trained simultaneously.

Initially, the weights for the UCAIN networks are initialized with the same values as the mCAIN network that have been determined in the first training step where weight dimensions match. Elsewhere, for instance in the first convolution layer 203 that has different dimensions depending on the number of input images, the weights of the UCAIN networks are randomly initialized.

In systems implementing image interpolation utilizing a pyramidal UCAIN approach having more than 3 levels, the training concept described with reference to FIG. 5 is cascaded until the last UCAIN neural network is included in the training.

Flow Diagram

Figure 13:
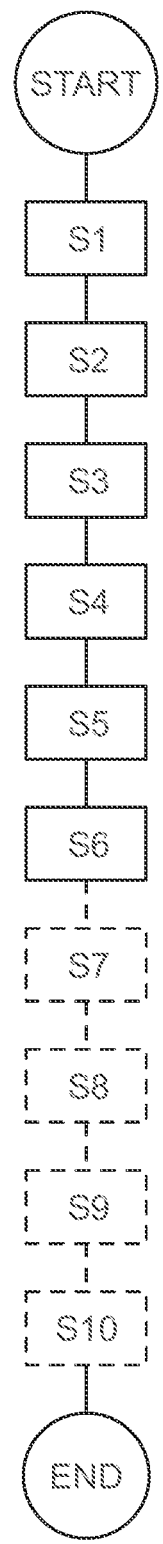
FIG. 13—a flow diagram of the method according to the present disclosure.

FIG. 13 shows a flow diagram illustrating the method for interpolating intermediate images between two consecutive anchor images $I_1$; $I_2$ in a video input stream 101 according to the present disclosure. The method comprises providing (step S1) the images of the video input stream 101 in a first and a second image resolution, wherein the second image resolution is higher than the first image resolution;

receiving (step S2) the anchor images in the first image resolution in a first neural network 513;

processing (step S3) the anchor images in the first neural network 513 trained for interpolating one or several first intermediate image(s) in the first image resolution;

upscaling (step S4) the first intermediate image(s) to the second image resolution;

receiving (step S5) the upscaled first intermediate image(s) and the anchor images in the second image resolution in a second neural network 523, processing (step S6) the anchor images in the second image resolution and the upscaled first intermediate image(s) in the second neural network 523, which is trained for interpolating one or several second intermediate image(s) in the second image resolution.

Optionally step S6 of processing anchor images $I_1$, $I_2$ and/or one or several intermediate images includes generating a single composed feature map as step S7.

Furthermore, step S7 of generating the single composed feature map comprises concatenating (step S8) the two anchor images and previous level's upscaled intermediate image(s) in a channel wise manner and processing (step S9) the single composed feature map in a neural network trained to produce an output feature map that contains all channels of at least one intermediate image.

Finally, the method may further comprise decomposing (step S10) the output feature map into at least two intermediate images $\hat{I}\raisebox{0.25ex}{$\frac{1}{3}$},\hat{I}\raisebox{0.25ex}{$\frac{2}{3}$}$.

Figure 12:
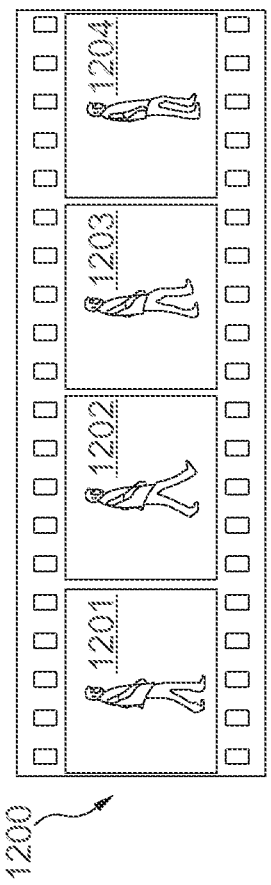
FIG. 12—a video stream with 150 FPS.

Since steps S7 to S10 are only optional, these steps are displayed in FIG. 12 with dashed lines.

CLOSING REMARKS

Individual components or functionalities of the present invention are described in the embodiment examples as software or hardware solutions. However, this does not mean that a functionality described as a software solution cannot also be implemented in hardware and vice versa. Similarly, mixed solutions are also conceivable for a person skilled in the art, in which components and functionalities are simultaneously partially realized in software and hardware.

In the claims, the word "comprising" does not exclude other elements or steps, and the indefinite article "a" does not exclude a plurality. A single unit or device may perform the functions of multiple elements recited in the claims. The fact that individual functions and elements are recited in different dependent claims does not mean that a combination of those functions and elements could not advantageously be used.

LIST OF REFERENCE SIGNS

| | |
|---|---|
| 101 | Camera stream |
| 102 | Processing stage |
| 103 | Output stream |
| 104 | Dashed frame |
| 106 | Frame |
| 200 | CAIN network |
| 201 | Down shuffle stage |
| 202 | Processing stage |
| 203 | Convolution layer |
| 204 | Residual group |
| 206 | Summing stage |
| 207 | Residual connection |
| 208 | Convolution layer |
| 209 | Up shuffling stage |
| 401 | RCA block |
| 402, 403 | Convolution layer |
| 404 | Rectified linear unit |
| 406 | CA module |
| 407 | Summing stage |
| 408 | Residual connection |
| 411 | Pooling stage |
| 412 | Convolution layer |
| 413 | Rectified linear unit |
| 414 | Convolution layer |
| 416 | Sigmoid function stage |
| 417 | multiplication stage |
| 418 | Residual connection |
| 511 | First network layer |
| 512 | Input images |
| 513 | Network |
| 514 | Intermediate images |
| 521 | Second network layer |
| 522 | Input images |
| 523 | Network |
| 524 | Intermediate images |
| 531 | Third network layer |
| 532 | Input images |
| 533 | Network |
| 534 | Intermediate images |
| 600 | mCAIN network |
| 800 | UCAIN network |
| 801 | Down shuffle stage |
| 802 | Processing stage |
| 900 | System |
| 901 | mCAIN network |
| 902 | Up-sampling stage |
| 903 | UCAIN network |
| 904 | Up-sampling stage |
| 905 | UCAIN network |
| 1001 | Down shuffle stage |
| 1002 | Processing stage |
| 1101 | Video camera |
| 1102 | Vision router |
| 1103 | Vision mixer |
| 1104 | Replay server |
| 1105 | Slow-motion apparatus |
| 1200 | 150 FPS video stream |
| 1201 | First image |
| 1202 | Second image |
| 1203 | Third image |
| 1204 | Forth image |

The invention claimed is:

1. A method for interpolating intermediate images between two consecutive anchor images in a video input stream, the method comprising:
   providing the two consecutive anchor images of the video input stream in a first and a second image resolution, wherein the second image resolution is higher than the first image resolution;
   receiving the two consecutive anchor images in the first image resolution in a first neural network;
   processing the two consecutive anchor images in the first neural network trained for interpolating one or several first intermediate image(s) in the first image resolution;
   upscaling the one or several first intermediate image(s) to the second image resolution;
   receiving the one or several upscaled first intermediate image(s) and the two consecutive anchor images in the second image resolution in a second neural network; and
   processing the two consecutive anchor images in the second image resolution and the one or several upscaled first intermediate image(s) in the second neural network, which is trained for interpolating one or several second intermediate image(s) in the second image resolution.

2. The method according to claim 1, further comprising:
   providing the two consecutive anchor images of the video input stream in 1 to n different image resolutions, wherein the first image resolution is the lowest image resolution and the n-th image resolution is the highest image resolution, wherein k is an integer between 1 and n;
   upscaling an intermediate image(s) having a (k−1)th image resolution to a k-th image resolution;
   receiving the upscaled intermediate image(s) and the anchor images in the k-th image resolution as input for a k-th neural network; and
   processing the anchor images in the k-th image resolution and the previous level's upscaled intermediate image(s) in the k-th neural network, which is trained for interpolating one or several intermediate image(s) in the k-th image resolution.

3. The method according to claim 1, wherein the anchor images are received in a format with H vertical pixels, W horizontal pixels and C color channels, and wherein each anchor image can be represented as a three-dimensional tensor having a format of H×W×C.

4. The method according to claim 3, further comprising transforming the anchor images into a different format having fewer horizontal and fewer vertical pixels and more color channels, such that the transformed images are represented as another three-dimensional tensor having the format $H/s \times W/s \times s^2 C$.

5. The method according to claim 1, wherein the processing the two consecutive anchor images and one or several upscaled intermediate image(s) includes generating a single composed feature map.

6. The method according to claim 5, wherein the generating the single composed feature map comprises concatenating the two consecutive anchor images and previous level's one or several upscaled intermediate image(s) in a channel wise manner.

7. The method according to claim 3, wherein each neural network is trained to produce an output feature map that contains all channels of at least one intermediate image.

8. The method according to claim 7, further comprising, if necessary, decomposing the output feature map into at least two or more intermediate images.

9. A computer program product including program code, which implements the method according to claim 1 when the program code is executed on a computer.

10. A broadcast production system comprising a plurality of video cameras, a vision router, a replay server, and a vision mixer, wherein each video camera generates a video stream with a first frame rate, which are supplied to the vision router transferring the camera streams to the vision mixer and the replay server, wherein the replay server stores all camera streams and enables selection of one of the camera streams for replay, and wherein the vision mixer generates a program output stream, characterized in that the broadcast production system further comprises an interpolation device that interpolates one or several intermediate images between two consecutive images in the video stream selected for replay to create a slow-motion video stream with a second frame rate that is higher than the first frame rate; and wherein the interpolation device is configured to implement the method according to claim 1.

11. The broadcast production system according to claim 10, wherein the slow-motion video stream is provided to the vision mixer.

12. The broadcast production system according to claim 10, wherein the interpolation device is integrated into the replay server.

13. The broadcast production system according to claim 10, wherein the interpolation device is implemented as a cloud service.

14. The broadcast production system according to claim 10, wherein the interpolation device comprises a convolutional neural network.

* * * * *